(12) United States Patent  (10) Patent No.: US 8,383,959 B2
Kessler  (45) Date of Patent: *Feb. 26, 2013

(54) METAMATERIAL SPHERIC ALIGNMENT MECHANISM

(76) Inventor: Stephen Burns Kessler, St. Louis, MO (US)

(*) Notice: Subject to any disclaimer, the term of this patent is extended or adjusted under 35 U.S.C. 154(b) by 558 days.

This patent is subject to a terminal disclaimer.

(21) Appl. No.: 12/343,033

(22) Filed: Dec. 23, 2008

(65) Prior Publication Data

US 2009/0139762 A1  Jun. 4, 2009

Related U.S. Application Data

(63) Continuation-in-part of application No. 11/108,424, filed on Apr. 18, 2005, now Pat. No. 7,507,916, and a continuation-in-part of application No. 11/192,610, filed on Jul. 29, 2005, now Pat. No. 7,465,886.

(51) Int. Cl.
*H05K 9/00* (2006.01)
*H02B 1/015* (2006.01)
*H01T 13/08* (2006.01)

(52) U.S. Cl. ............ 174/377; 174/125.1; 505/236

(58) Field of Classification Search .......... 174/377, 174/382, 394, 125.1; 361/816, 818; 505/236
See application file for complete search history.

(56) References Cited

U.S. PATENT DOCUMENTS

| | | | |
|---|---|---|---|
| 4,227,479 A | 10/1980 | Gertler et al. | |
| 4,738,390 A * | 4/1988 | Brennan | 229/77 |
| 4,774,519 A | 9/1988 | Pease et al. | |
| 4,874,346 A | 10/1989 | Wachspress | |
| 4,962,488 A | 10/1990 | Dell-Imagine et al. | |
| 5,197,279 A * | 3/1993 | Taylor | 60/203.1 |
| 5,204,568 A | 4/1993 | Kleinberg et al. | |
| 5,267,091 A | 11/1993 | Chen | |
| 5,430,009 A | 7/1995 | Wang | |
| 5,517,202 A | 5/1996 | Patel et al. | |
| 5,590,031 A | 12/1996 | Mead, Jr. et al. | |
| 5,590,331 A | 12/1996 | Lewis et al. | |
| 5,831,362 A | 11/1998 | Chu et al. | |
| 5,841,211 A | 11/1998 | Boyes | |
| 6,024,935 A | 2/2000 | Mills et al. | |
| 6,144,342 A | 11/2000 | Bertheas et al. | |
| 6,193,194 B1 | 2/2001 | Minovitch | |
| 6,318,666 B1 | 11/2001 | Brotz | |
| 6,683,579 B1 | 1/2004 | Riveria | |

(Continued)

FOREIGN PATENT DOCUMENTS

WO  03003385 A2  1/2003

OTHER PUBLICATIONS

U.S. Appl. No. 10/998,401, Volfson.

(Continued)

*Primary Examiner* — Hung Ngo
(74) *Attorney, Agent, or Firm* — Ladas & Parry LLP

(57) ABSTRACT

A chamber or series of chambers is formed from layers of nested shells and used to manipulate a work product within the chambers. The shells are formed from highly ordered material structures, such as superconductors and metamaterials, and the work product is manipulated using energy that is directed from the outside of the chamber, through the nested shells and into the chamber. The nested shells have an open position and a closed position or have a bridge through which a working material can be passed from one set of nested shells to another set of nested shells. The superconducting shells can be type-1 or type-2, and the metamaterial shells can include any combination of a frequency agile metamaterial, a split ring resonator, an artificial structure of a wire medium, a unit cell of an artificial magnetic metamaterial, metamaterial superlattices and any combination thereof, or other highly ordered composite metamaterials.

22 Claims, 12 Drawing Sheets

U.S. PATENT DOCUMENTS

| | | | |
|---|---|---|---|
| 6,859,114 B2 | 2/2005 | Eleftheriades et al. | |
| 6,907,839 B2 | 6/2005 | Kruger et al. | |
| 6,938,325 B2 | 9/2005 | Tanielian | |
| 6,958,729 B1 | 10/2005 | Metz | |
| 6,960,975 B1 | 11/2005 | Volfson | |
| 7,148,579 B2 | 12/2006 | Pinkerton et al. | |
| 7,150,089 B2 | 12/2006 | Scafidi | |
| 7,391,032 B1 | 6/2008 | Hyde et al. | |
| 7,429,957 B1 | 9/2008 | Tonn | |
| 2002/0104670 A1* | 8/2002 | Marmel | 174/350 |
| 2003/0019096 A1 | 1/2003 | Weihs | |
| 2005/0107681 A1 | 5/2005 | Griffiths | |
| 2005/0272996 A1 | 12/2005 | Matsui et al. | |
| 2007/0109023 A1 | 5/2007 | Beausoliel et al. | |
| 2007/0237279 A1 | 10/2007 | Cheang | |
| 2008/0266028 A1 | 10/2008 | Wyland | |
| 2011/0109102 A1* | 5/2011 | McCoy et al. | 290/1 R |

OTHER PUBLICATIONS

PCT/US05/41751, Search Report (Feb. 19, 2009).

PCT/US05/41751, Written Opinion (Feb. 19, 2009).

Fang, et al., The Anomalous Hall Effect and Magnetic Monopoles in Momentum Space, Science, vol. 32 (Oct. 3, 2003) www.sciencemag.org.

Peacock, J.A., Large-Scale Surveys and Cosmic Structure, Inst. for Astronomy, U of Edinburgh, arXiv:astro-ph/0309240 v3, (Nov. 24, 2003).

The Force of Acoustics, physicsweb (Dec. 4, 1998).

Kosowsky, Seeing Sound Waves in the Early Universe, Dept. of Physics and Astronomy, Rutgers Univ., arXiv:astroph/9811163 v1 (Nov. 1, 1998).

Aguiar, et al, Spinodal Instability in the Quark-Gluon Plasma, Brazilian J. of Physics, 34(1A):307-309 (Mar. 2004).

Roberts, Vacuum Energy, http://cosmology.mth.uct.ac.za/~roberts, arXiv:hep-th/0012062 v3 (Jul. 22, 2001).

Edelmann, An Overview of Time-Reversal Acoustic Communications, U.S. Naval Research Laboratory.

Cassereau, et al., The Phased Array Technology—Application to Time-Reversal in Acoustics, Laboratoire Ondes et Acoustique.

Singh, et al., Electron Acceleration by a Plasma Wave in a Sheared Magnetic Field, Physics of Plasmas, 10(5): 1493-1499 (May 2003).

You, et al., Dynamic and Stagnating Plasma Flow Leading to Magnetic Flux Tube Collimation, CA Inst. of Tech., pp. 1-4, arXiv:physics/0506221 v1 (Jun. 29, 2005).

Scandurra, QFT Limit of the Casimir Force, MIT Center for Theoretical Physics, MIT-CTP-3397, pp. 1-5, arXiv:hep-th/0306076 v2 (Jul. 14, 2003).

Xiao, et al., Magnetic Flux Distribution on a Spherical Superconducting Shell, Physica B 194-196, 65-66 (1994).

Doria, et al., Transition to a Superconductor with Insulating Cavities, Europhysics Letters, pp. 2-7, arXiv:cond-mat/0407599 v1 (Jul. 22, 2004).

Du, et al., Approximations of a Ginzburg-Landau Model for Superconducting Hollow Spheres Based on Spherical Centroidal Voronoi Tessellations, pp. 1-24.

Latkowski, et al., Waste Disposal Assessment for the Final Focusing Magnets in the RPD-2002* ARIES Project Meeting (May 5-6, 2003).

Yeo, et al., Non-integer Flux Quanta for a Spherical Superconductor, pp. 1-16, arXiv:cond-mat/9710003 v1 (Oct. 1, 1997).

Du, et al., Numerical Simulations of the Quantized Vortices on a Thin Superconducting Hollow Sphere, J. of Computational Physics, 201:511-530 (2004).

Baelus, et al., Saddle Point States and Energy Barriers for Vortex Entrance and Exit in Superconducting Disks and Rings, pp. 1-10, arXiv:cond-mat/0010217 v1 (Oct. 16, 2000).

Iannotta, Expected Shifts in Rotation, NewScientist Planet Science, No. 2045 (Aug. 1996).

Daul, et al., Vacuum-field Atom Trapping in a Wide Aperture Spherical Resonator, pp. 1-12, arXiv:quant-ph/0311048 v3 (Jan. 17, 2005).

Vodolazov et al., Dynamic Transitions Between Metastable States in a Superconducting Ring, pp. 1-7, arXiv.cond-mat/0207549 v1 (Jul. 23, 2002).

Dodgson, et al., Vortices in a Thin Film Superconductor with a Spherical Geometry, Univ. of Manchester, pp. 1-19, arXiv:cond-mat/9512123 v2 (Jun. 10, 1996).

Robertson, Newtonian Gravity Predictions for Gravity Probe B, pp. 1-9, arXiv:gr-qc/0502088 v3 (Feb. 24, 2005).

Fomin, et al., Superconductivity in a Mesoscopic Double Square Loop: Effect of Imperfections, pp. 1-9, arXiv:cond-mat/0001201 v2 (Jan. 14, 2000).

Schweigert, et al., Vortex Phase Diagram for Mesoscopic Superconducting Disks, pp. 1-9, arXiv:cond-mat/9806013 v1 (Jun. 1, 1998).

* cited by examiner

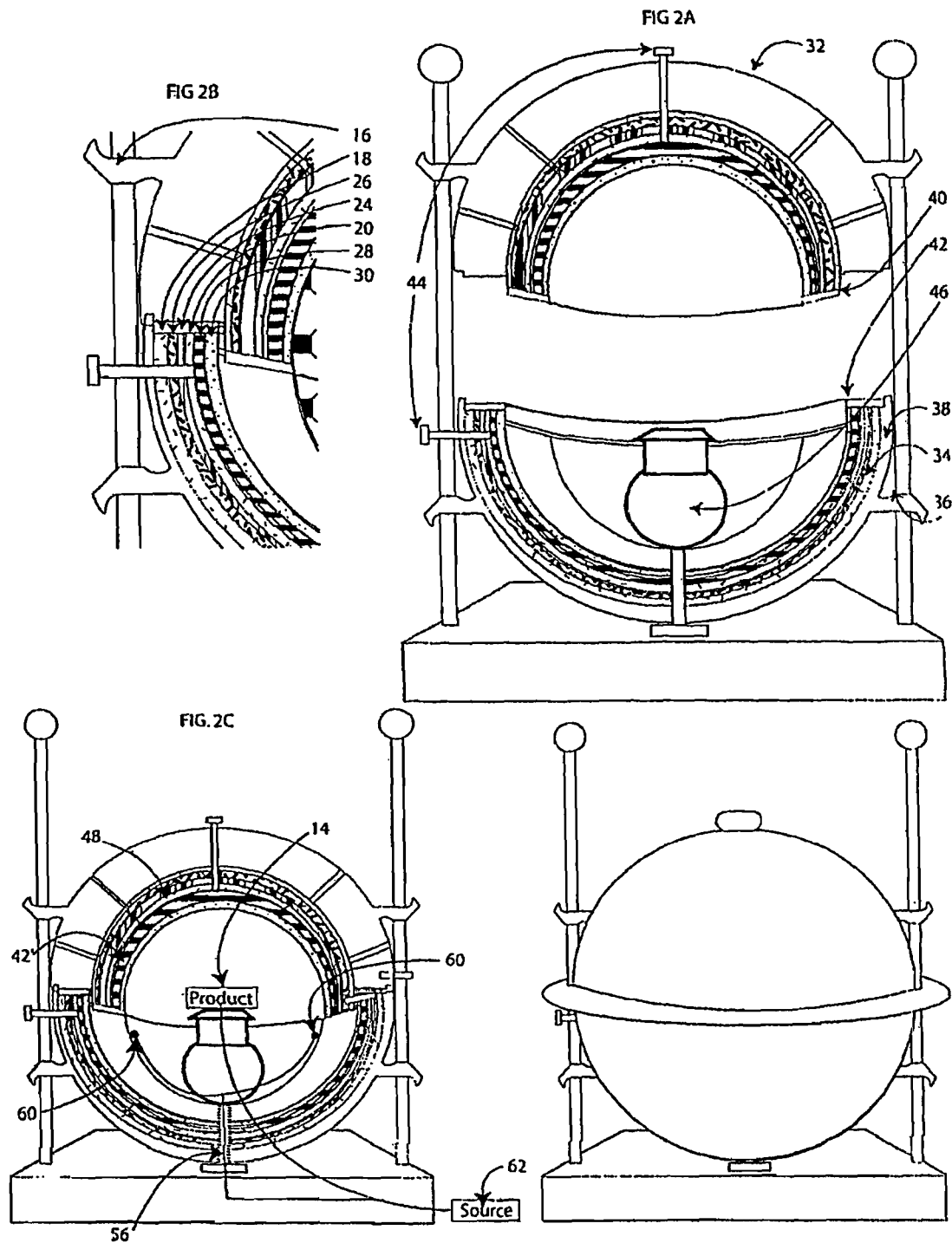

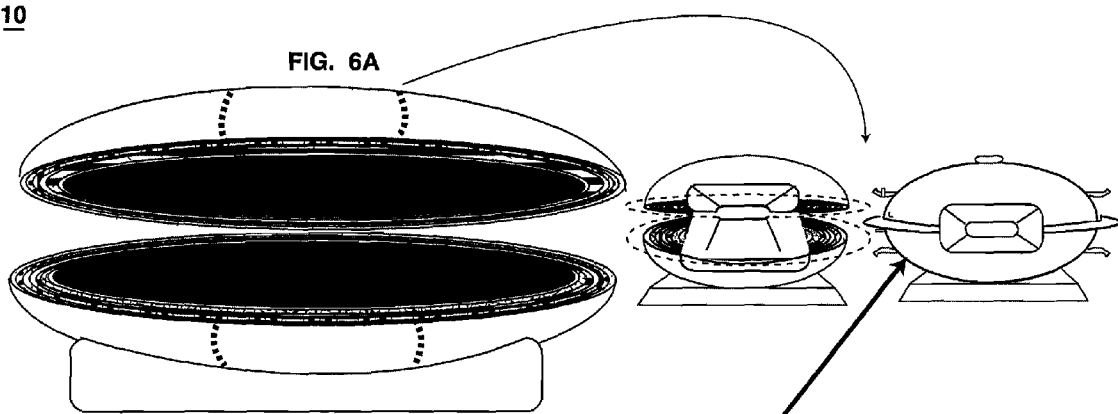
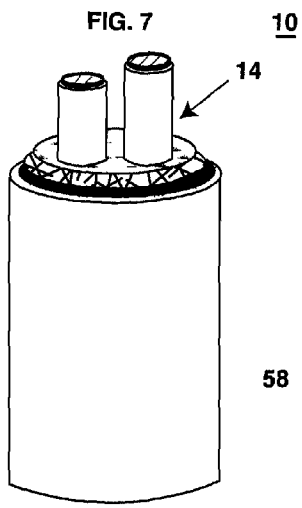
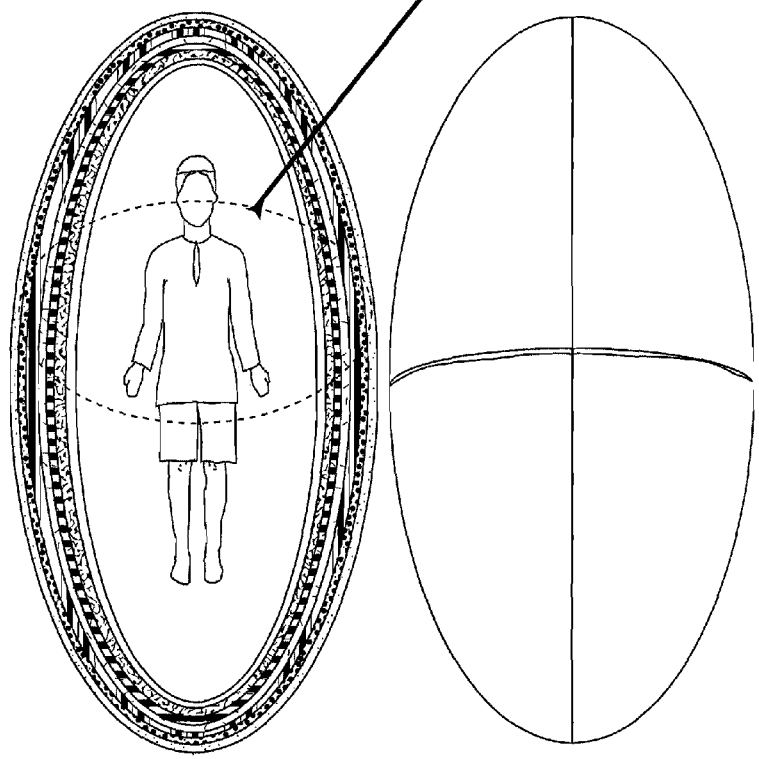

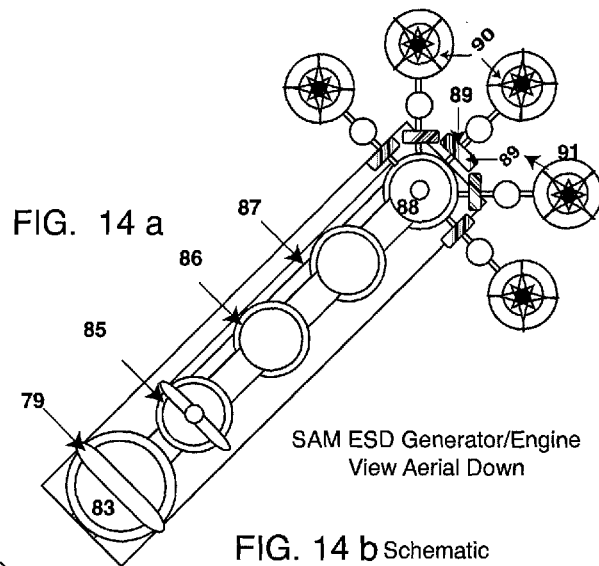
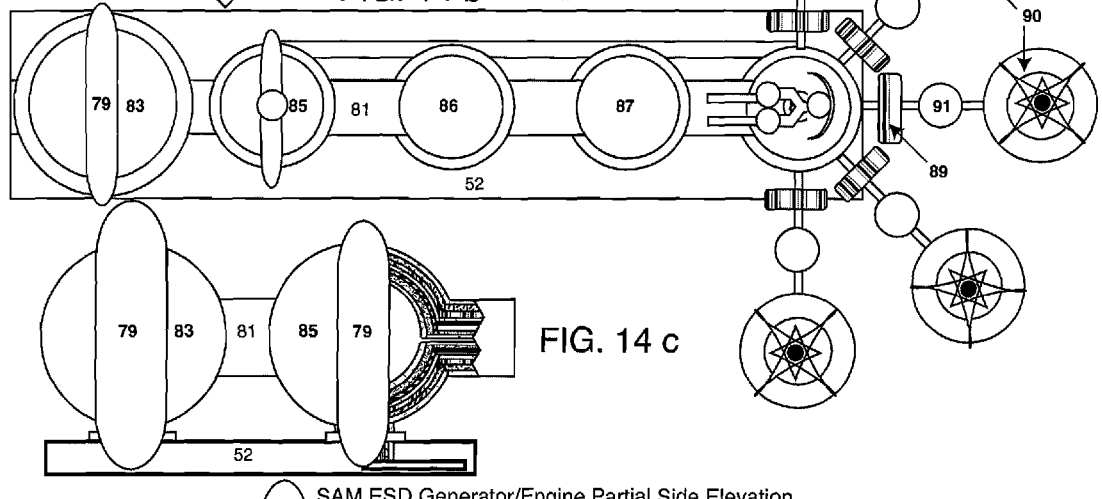
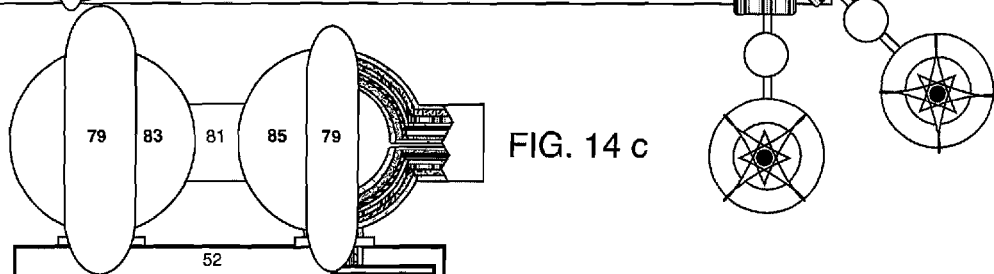
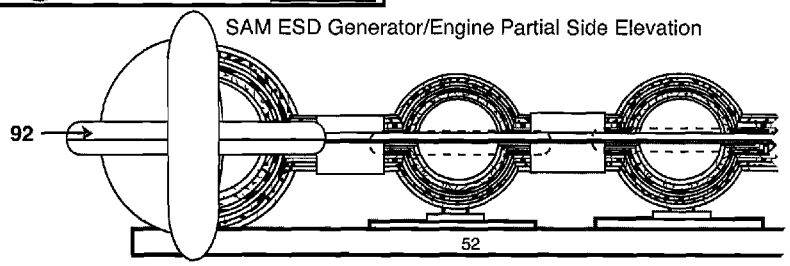
FIG. 14 a
SAM ESD Generator/Engine View Aerial Down
FIG. 14 b Schematic
FIG. 14 c
SAM ESD Generator/Engine Partial Side Elevation
FIG. 14 d

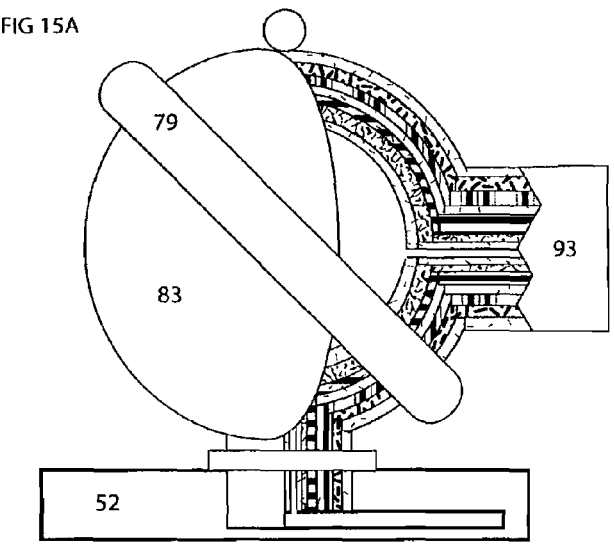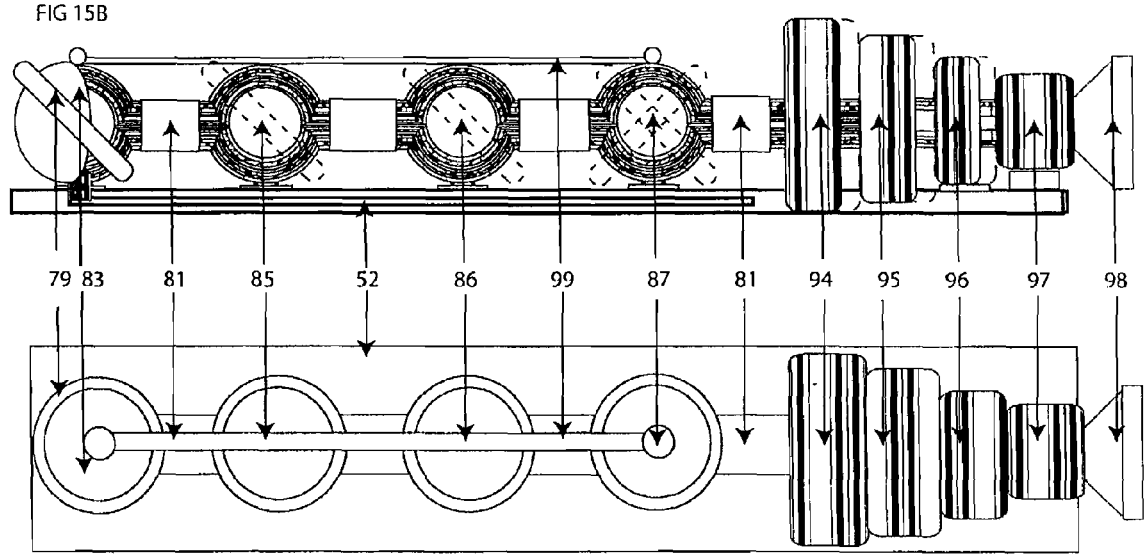

Chamber 87 Alternate Interior
Wave Cancellation
Apparatus Schematic a. Plasma wave Holding chamber
b. Variable 180° Phase Holding Chamber
c. Innermix chamber
d. distribution compartment

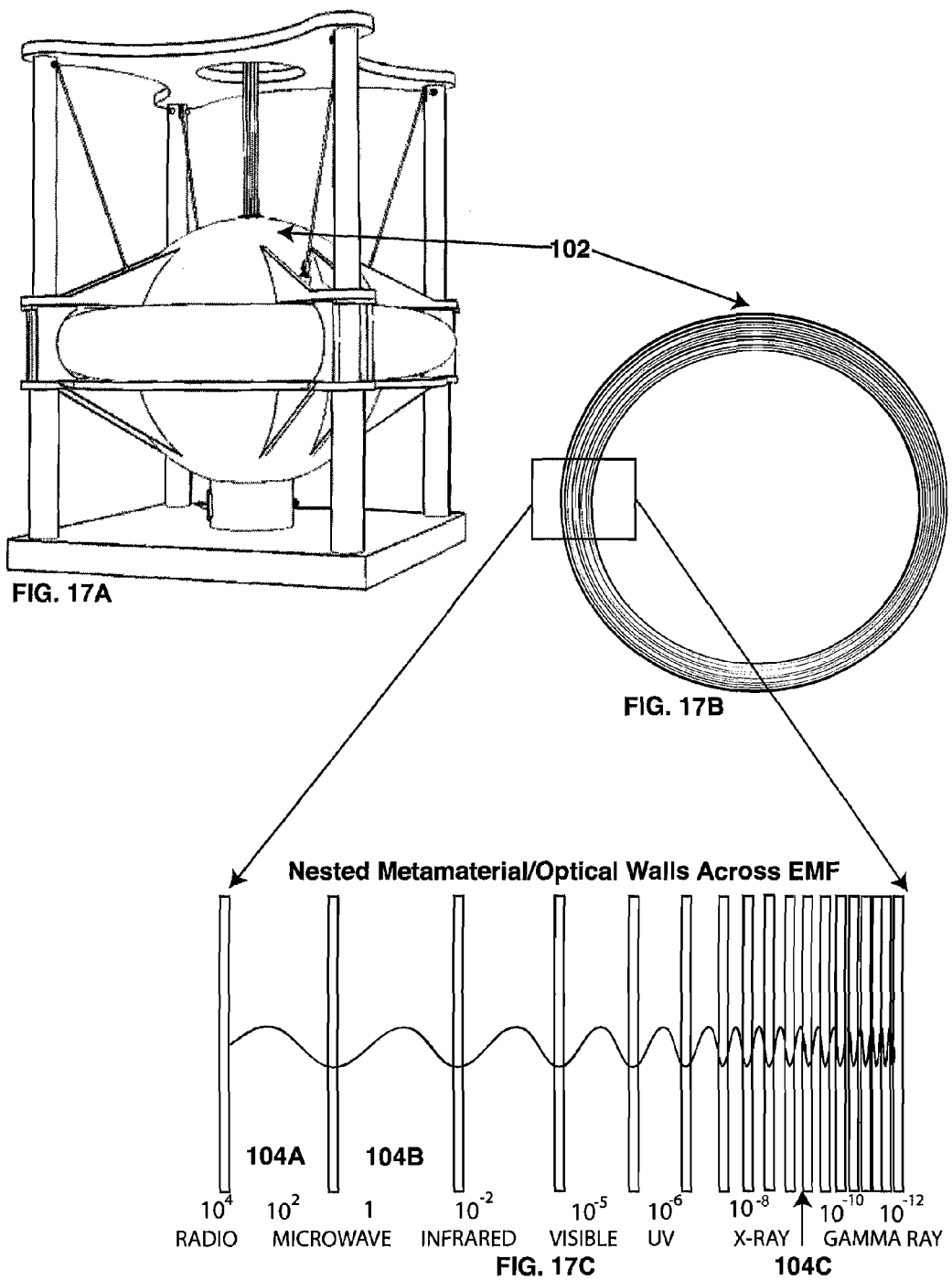

METAMATERIAL SPHERIC ALIGNMENT MECHANISM

CROSS-REFERENCE TO RELATED APPLICATIONS

This application is a continuation-in-part of U.S. application Ser. No. 11/108,424 filed on Apr. 18, 2005 now U.S. Pat. No. 7,507,916 and U.S. application Ser. No. 11/192,610 filed on Jul. 29, 2005 and issued on Dec. 16, 2008 as U.S. Pat. No. 7,465,886.

BACKGROUND OF THE INVENTION

1. Field of the Invention

The present invention relates to superconductive materials, and more particularly, to a superconducting shell(s) with electromagnetic shielding surrounding a work product in an entropically isolated environment with kinetic facilitation of energy generation or propulsion.

2. Related Art

Generally, quantum physics predicts that all of space is filled with zero-point fluctuations, also called the zero-point field, creating a universal sea of zero-point energy. The density of this energy depends critically on where in frequency the zero-point fluctuations cease. Since space itself is thought to break up into a kind of quantum foam at a tiny distance scale called the Planck scale ($10^{-33}$ cm), it is argued that the zero point fluctuations must cease at a corresponding Planck frequency ($10^{43}$ Hz). According to this theory, the zero-point energy density would be 110 orders of magnitude greater than the radiant energy at the center of the sun.

There are numerous patents whose claims use electromagnetic radiation to facilitate conversion of zero point energy into usable electrical energy, such as U.S. Pat. No. 5,590,031. It has also been suggested that a superconducting sphere could be used to interact with an external geomagnetic field to propel a vehicle within the field, such as in U.S. Pat. No. 6,318,666, and that plasma could be phased to interference waves using electromagnetism, such as in U.S. Pat. No. 5,966,452. However, these prior devices fail to disclose or suggest a superconducting shell according to the present invention, which does not interact with external geomagnetic field, or any other ambient magnetic or electrical field, but instead shields the interior of the shell from such fields to use sound and kinesis as an energy driver. Therefore, these prior devices cannot provide an entropically isolated environment for a work product within such devices.

SUMMARY OF THE INVENTION

Generally, the present invention provides an entropically isolated environment for a work product within a chamber. In particular, the present invention is a chamber formed by a series of nested shells that shield a work product within the chamber from electromagnetic fields from the ambient environment around the chamber. Generally, the nested shells act to mitigate the electromagnetic field from getting past the high order of the structures. In one embodiment of the invention, at least one shell is superconductive. The superconducting shells can be made of either overlapping individual superconductors or made of a solid superconductor wall and a series of nested shells can be connected through one or more bridges. Other embodiments may use different types of highly ordered materials for the nested shells which act to mitigate the electromagnetic field from getting past the high order of the structures, such as metamaterials. Even though the materials are interchangeable the principles remain the same; in other words, each embodiment teaches the same scientific principles and applications. To that end, the embodiments will be summed by the word shells which are constructed of highly ordered materials. The work product can be manipulated using kinetic energy or electromagnetic energy encapsulated in isolated conduit wrapping to maintain the electromagnetic free phase state in one shell or a series of connected shells.

The present invention effects zero point energy on atomic strong/weak force and molecular structures by creating an entropically isolated environment in which ambient electromagnetic fields are minimized during the critical initiating phase of energetic conversion of zero point energy. More particularly, the chamber of the present invention maintains a mixed state of low entropy followed by high entropy and effects atomic and molecular structures of the work product placed within the chamber. Accordingly, the chamber can be used in biophysics/life sciences, electronics, computer science, energy production, propulsion, particle physics, electromagnetism, chemistry, pharmaceuticals and material science.

Further areas of applicability of the present invention will become apparent from the detailed description provided hereinafter. It should be understood that the detailed description and specific examples, while indicating the preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein:

FIGS. 2A, 2B and 2C illustrate cross-sectional views of FIG. 1 chamber;

FIGS. 6A and 6B illustrate an alternative embodiment of the present invention;

FIG. 7 illustrates an alternative embodiment of the present invention;

FIG. 14 illustrates an alternate embodiment of the present invention called ESD;

FIG. 15 illustrates an alternate embodiment of the present invention called EPS;

FIGS. 17A, 17B, and 17C illustrate another alternative embodiment.

DETAILED DESCRIPTION OF THE PREFERRED EMBODIMENTS

Figure 1:
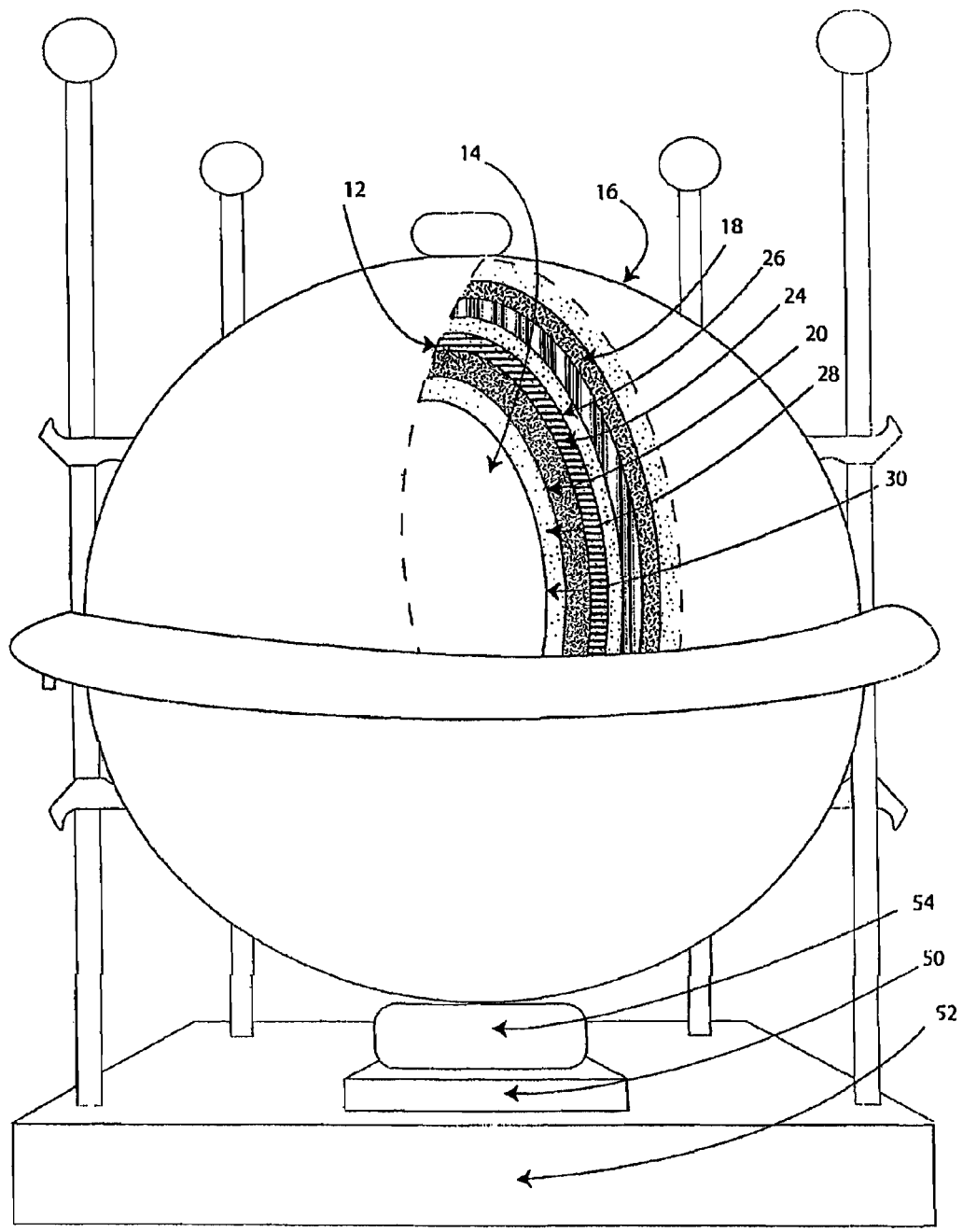
FIG. 1 illustrates an isometric, cutaway view of the present invention.

Referring to the accompanying drawings in which like reference numbers indicate like elements, FIG. 1 illustrates a cutaway view of the Spheric Alignment Mechanism chamber 10 in an exemplary embodiment. The chamber 10 is formed in layers as a series of nested shells 12 which surround the work product 14 at the interior portion of the chamber 10. An outer structural casing 16 forms the exterior surface of the chamber 10. Within the structural casing 16, an electromagnetic shield 18 which surrounds a superconducting shell 20. The superconducting shell 20 is preferably immersed in a cryogenic coolant 22 contained in a reservoir 24. The reservoir 24 is preferably formed by a pair of Dewar flasks 26, 28 on opposite sides of the superconducting shell 20, i.e. the superconducting shell is sealed between the outer Dewar flask 26 and inner Dewar flask 28. The inner Dewar flask 28 is preferably protected by an inner casing 30 around the interior portion of the chamber 10.

As illustrated in FIG. 2A, the chamber 10 can be formed from two interconnected hemispheres 32, 34 within a support structure 36. In particular, poles 38 can align the hemispheres 32, 34 while permitting the upper hemisphere 32 to slide relative to the lower hemisphere 34 and holding the lower hemisphere 34 in place. The hemispheres 32, 34 preferably include overlapping sections 40 that are sealed together with a flange 42 that may provide a pressure-seal 42'. A detail view of the chamber's layers 12 in the overlapping section 40 is illustrated in FIG. 2B. Each of the hemispheres 32, 34 preferably has an intake valve 44 through which the cryogenic coolant can be circulated. While the chamber 10 is open, the work product 14 can be set onto a platform 46 or placed directly onto the interior surface.

As illustrated in FIG. 2C, once the chamber 10 is closed, the work product 14 and the interior of the chamber 10 is shielded from outside electromagnetic radiation 48, including electric and magnetic fields and noise. Inside the closed chamber 10, the work product 14 is situated in an entropically isolated environment. In particular, when the chamber 10 is open, the work product 14 within the chamber is at an entropic level approximately equivalent to the ambient environment around the exterior of the chamber 10. However, once the chamber 10 is closed, the interior of the chamber 10, including the work product 14, has a higher entropic stasis level. The electromagnetic shield 18 can be made from any number of materials, including lead, niobium, and metal alloys such as alloys known as MUMETAL and/or METGLAS, as well as combinations of such shielding materials. For example, lead foil and/or niobium backing can be manufactured with or added to the Dewar flasks 26, 28. An interior vacuum or pressurization can be created within the chamber 10 relative to standard atmospheric conditions through a vacuum or pressurization system and sealed by the pressurized flange 42, respectively. The work product table 46 can contain the mechanisms for these systems 46', 46".

Figures 3A, 3B:
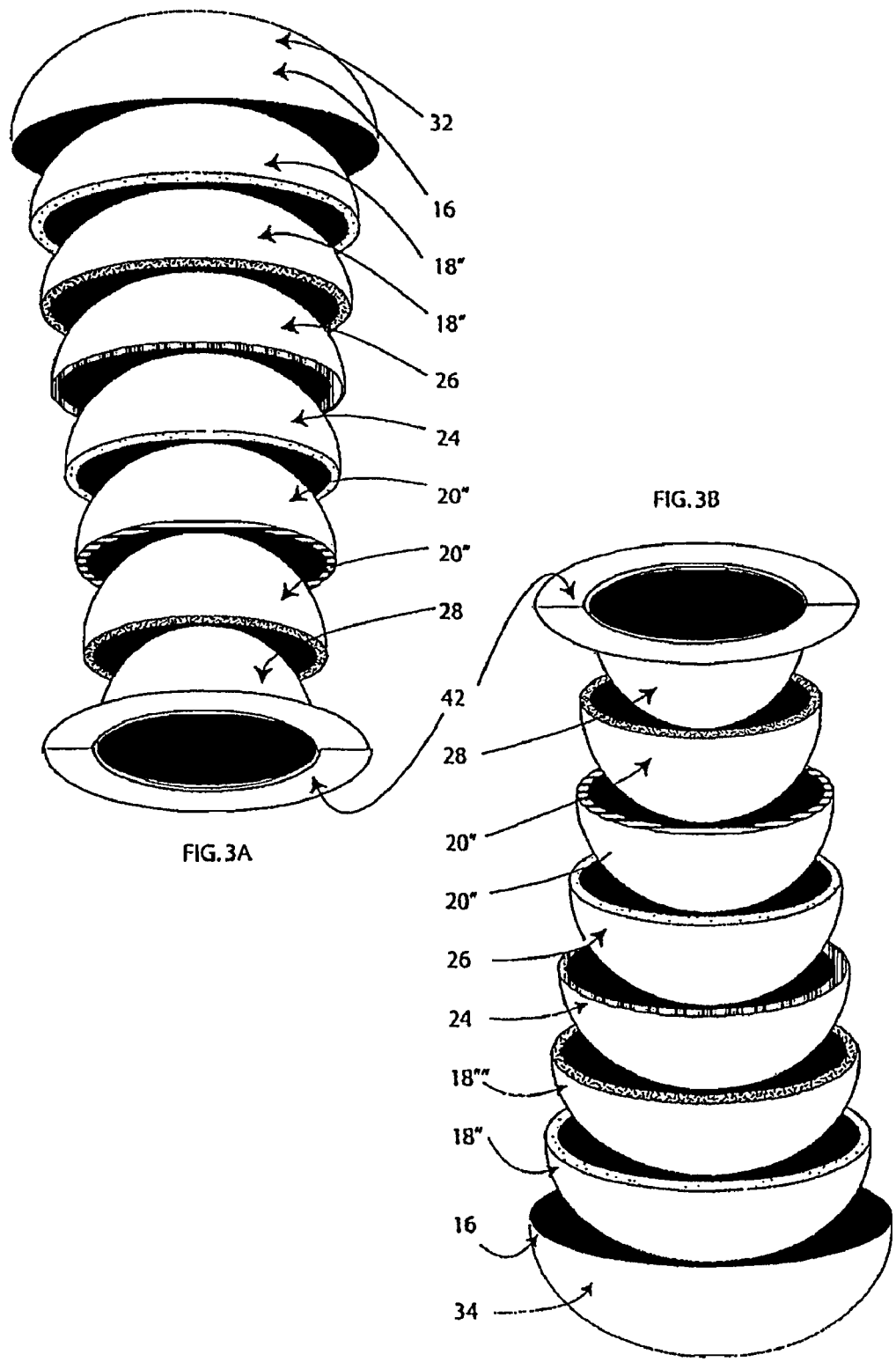
FIGS. 3A and 3B illustrate an exploded view of the chamber of FIG. 1.

An exploded view of the chamber's layers 12 are illustrated in FIGS. 3A and 3B. The superconducting shell may be formed as a solid, continuous shell 20', as overlapping shell sections 20" or any equivalent thereof. It will be appreciated that nested superconducting shells can also be used in the other embodiments of the present invention. As discussed above, it is preferable to completely surround the interior region of the chamber 10 by the superconducting shell 20.

The shielding 18 can be made from multiple layers, such as one layer of MUMETAL and/or METGLAS 18' that can be combined with lead foil and/or niobium backing 18".

It will be appreciated that the chamber's interior 10 can be maintained at a pressure and temperature equivalent to the surrounding ambient conditions, and does not need to be cryogenically cooled or evacuated to increase the entropic stasis level within the chamber 10 over that of the ambient environment outside the chamber 10. When a cryogenic coolant is used, the double-Dewar flasks minimize the heat-transfer between the coolant and the interior and exterior of the chamber 10. Examples of cryogenic coolants include liquid nitrogen, liquid hydrogen, liquid helium and solid nitrogen in aluminum foam. It will also be appreciated that any superconductive element can be used in the present invention, including superconductors now known as type-1 and type-2, and their equivalents, including any superconductor that may be made from materials that are superconductive at sea-level standard conditions, i.e., room temperature. For some applications, a single Dewar flask may be used.

Figure 4:
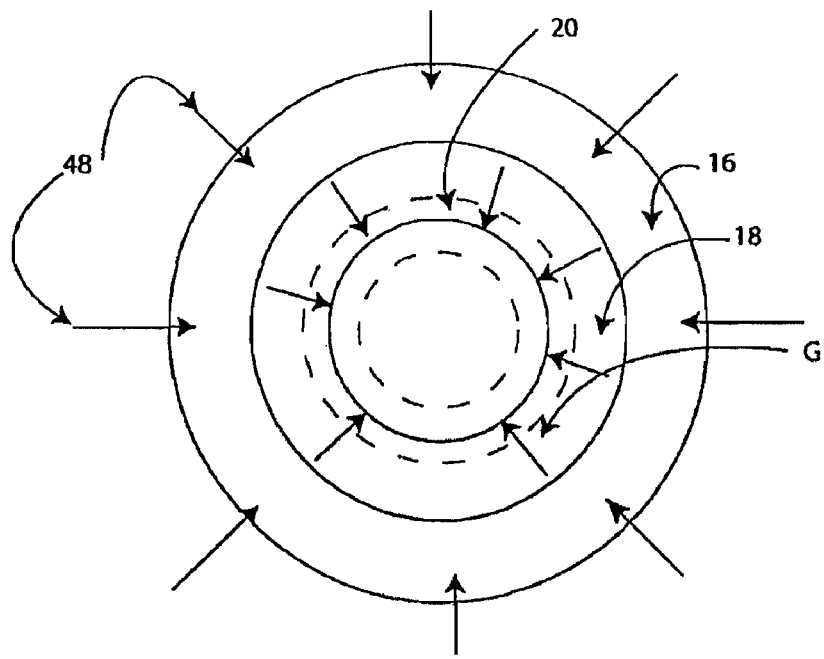
FIG. 4 illustrates a schematic representation of the present invention.

The general schematic arrangement of the chamber is illustrated in FIG. 4, Coulombically represented as a Gaussian surface (G) with a sphere of radius R lying just above the surface of the superconductive shell. The design of the chamber 10 enables electromagnetic field decay in the interior chamber by creating the entropically isolated environment. The equation for electric flux, according Gauss' law, is provided in equation 1 below, where A is the area of the surface and e is the electric field strength just above the surface of the conductor:

$$\Phi_B = eA = \frac{-Q}{\varepsilon_0}, \quad [\text{eq. 1}]$$

As discussed above and illustrated in FIG. 4, the interior of the chamber 10 is shielded from the electromagnetic fields 48, and as discussed in more detail below with reference to FIG. 3B, the chamber can include an electromagnetic pulse generator to alter the chamber's internal entropic state.

Figure 5:
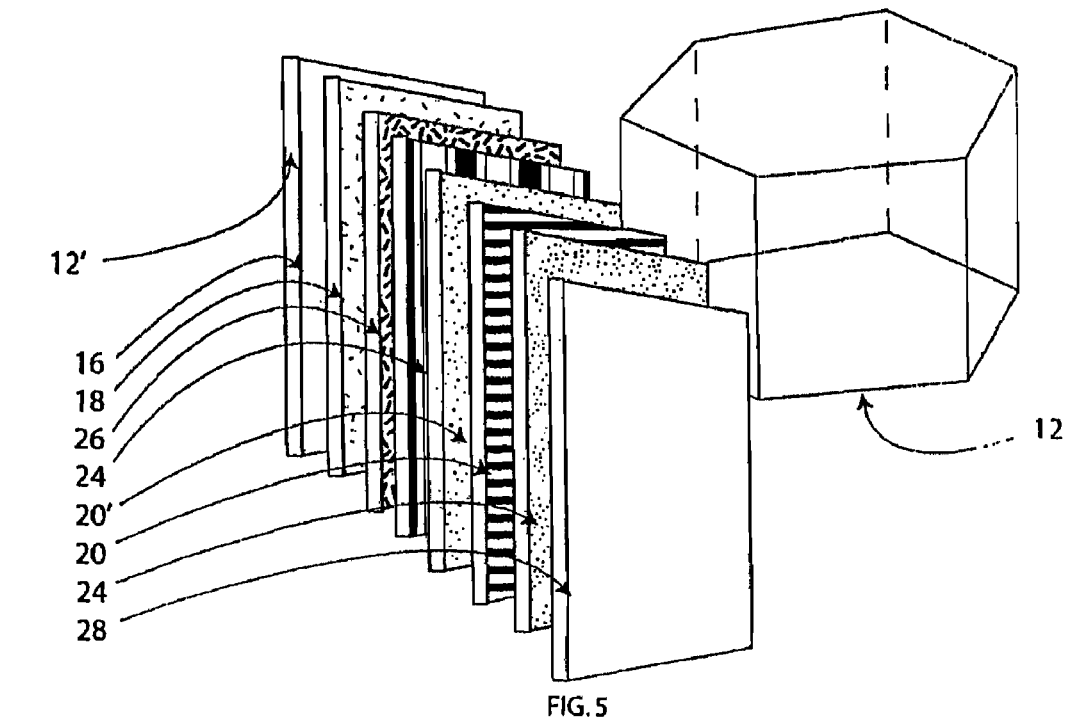
FIG. 5 illustrates an alternative embodiment of the present invention.

It will also be appreciated that the chamber 10 is not limited to being formed in the shape of a sphere and does not necessarily need to be made from a pair of hemispheres 32, 34. The chamber 10 can be formed in any geometric shape and from any number of sections that enclose the work product 14, such as illustrated in FIGS. 5, 6 and 7. As illustrated in FIG. 5, the chamber 10 can be formed by wall sections 12'. Each wall section 12' is formed from a set of nested shells 12 similar to those discussed above with respect to FIGS. 1, 2 and 3. As with the hemisphere shells 12, the wall sections 12' may overlap each other. Generally, the shells 12, 12' surround the work product 14 and permit the entry of the work product 14 into the interior portion of the chamber 10.

As particularly illustrated in FIG. 5, the wall sections 12' can be flat panels with the outer structural casing 16 and electromagnetic shield 18 surrounding the superconducting shell 20. These walls can enclose an operating area, reducing cellular necrosis for a patient with biophysical trauma. In one operating environment, exotic materials such as solid nitrogen and aluminum foam could be used, along with a niobium with METGLAS faced superconducting wall encased within a Dewar that is sealed in insulation and a metal casing.

FIG. 6A illustrates an embodiment in which the chamber 10 is a version of FIG. 1 elongated in the x-axis with shells 12 formed in an ellipsoid shape, and FIG. 7 particularly illustrates an embodiment of the chamber 10 in which the shells 12 are cylindrical and form a sheath 12" around the wire as the work product 14. The ellipsoid device can be used to reduce cellular necrosis resulting from a blunt trauma by placing a person within the chamber, illustrated in FIG. 6B. The chamber can be sized for portability, such as by removing the ends of the chamber, i.e., the ends identified by the dashed lines in FIGS. 6A and 6B. This portable embodiment can be sized as a Spheric Suspension Jacket is an example of a partially enclosed chamber 10 that surrounds the work product, or person, by completely enclosing the patient from the neck to the thighs. The Spheric Suspension Jacket can be used to reduce cellular necrosis for a patient with biophysical trauma in an ambulatory environment. This is accomplished by suspending environmental ambient electromagnetic field interaction on cells in the patient's spinal cord, minimizing cellular necrosis and temporarily stabilizing injury pending transfer into a full pod or suspension surgical theater for advanced trauma care. The sheathed wire device of FIG. 7 can be used to power electronic equipment within any one of the chambers 10.

Within the closed interior chamber 10, the work product 14 can be manipulated between its high entropy stasis and a lower entropy excitation mode. Excitation of the work product 14 and the interior chamber 10 can be performed by introducing electromagnetic and/or kinetic energy into the chamber 10. One example of transmitting kinetic energy into the chamber is a drive 50 that may be housed in the base 52 and which rotates the chamber 10. Another example would be a sound perturbation system 54, which may also be housed at the base 52 or elsewhere around the chamber 10. The sound perturbation system 54 can be tuned to the material frequencies of the work product 14. The amplifier and speaker can be outside the chamber 10, and the sound can be projected into the chamber 10 through a tuned resonant tube 56 and can be directed or otherwise focused to perturb the work product. Preferably, the tuned resonant tube is constructed using materials that enhance resonance and also provide shielding properties, such as METGLAS. Accordingly, the chamber 10 of the present invention eliminates, avoids and/or minimizes electromagnetic radiation during the critical initiating phase of energetic conversion of zero point energy by maintaining a mixed state of low entropy on one and followed immediately by high entropy in the other.

As an example of such kinetic energy manipulation, a yttrium work product 14 can be placed within the open chamber 10. The chamber 10 is closed and sealed, and sound waves of yttrium quantum vibration or associated frequency played from a storage medium are created by the sound perturbation system 54, projected into the chamber 10. For composite materials, the quantum vibrations will be a spectrum based on the composite's component materials, creating and blended to enable harmonic oscillations.

Electromagnetic energy can also be transmitted into the chamber 10 by a number of methods. A wire 58 can connect electromagnetic circuits 60 within the chamber 10 to an energy source 62 outside the chamber 10. Well-known electromagnetic circuits 60 can be used to excite the work product 14, such as a magnetic field generator, an electromagnetic field pulse initiator, a laser, and a light. The wire 58 preferably conducts electricity to the circuits 60 through the base 52. The wire 58 is preferably electromagnetically shielded and enclosed within a superconductive sheath 12" as illustrated in FIG. 7 and the electrodes may be similarly formed. Accordingly, in manipulating the work product using electromagnetic energy, the circuit should be encapsulated in isolated conduit wrapping to maintain the electromagnetic free phase state because without its encapsulation, the addition of the EMF field into the device would be a killer circuit. Multiple wires 58 can connect to multiple electrodes and other electromagnetic circuits 60 within the chamber 10. The electromagnetic devices can be situated on the platform 46 or spaced around the interior side of the shells 12. For example, the electromagnetic devices can be spaced at four equidistant points around the hemispheres 32, 34. As yet another example illustrated in FIGS. 8A and 8B, the electromagnetic devices can be spaced at six points.

Figure 8A:
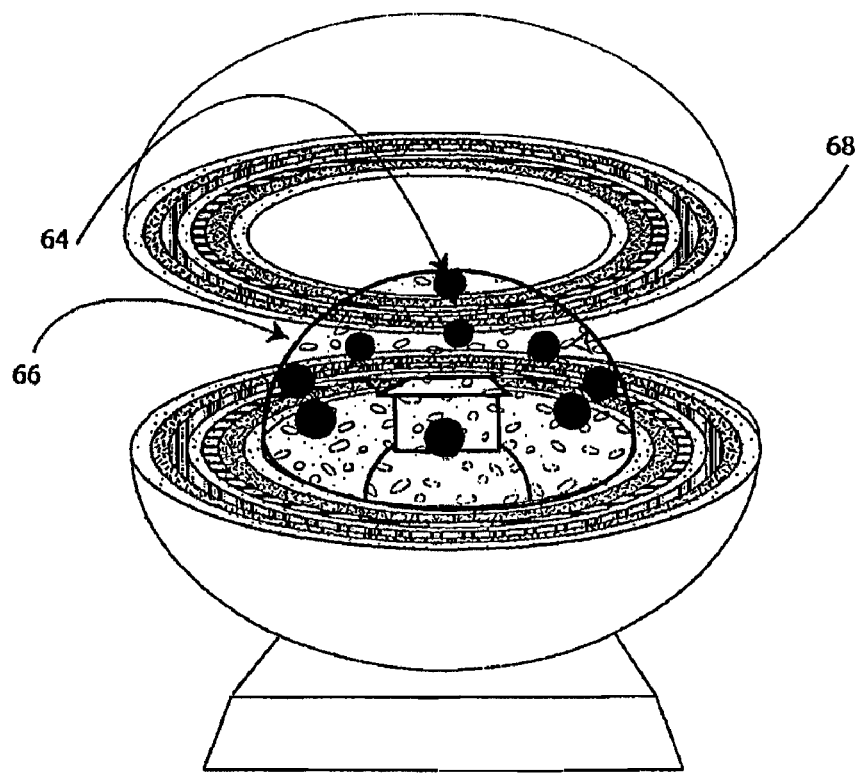
FIGS. 8A and 8B illustrate interior sectional views of the chamber.
Figure 8B:
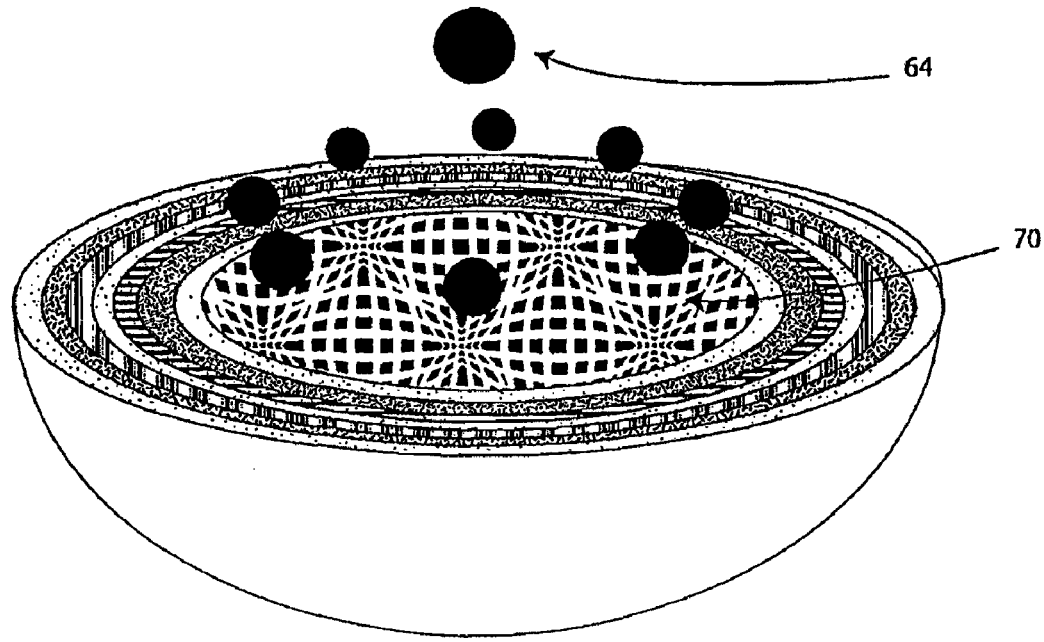

As particularly illustrated in FIGS. 8A and 8B, six point field initiators 64 can be situated in a niobium lattice 66 within the chamber 10, and can be powered by wires 58 entering through the base 52. Without listing all types field initiators, the function of the initiators is to create electromagnetic fields 68 within the chamber such as light, including the visible spectrum and coherent laser light, spark gap, as well as radio through gamma waves. The field pulse is variable, and the electromagnetic fields are used to initiate a low entropy pulse. As discussed in relation to the sound perturbation system 54 above, sound can also be used for high entropy interaction in the atomic and molecular structure of the work product. Additionally, the interior portion of the chamber can be fitted with an anechoic insert 70. A large chamber can use a superconducting quantum interference device (SQuID) to measure the resonant potential of varying molecules in the high entropy chamber and then initiate a harmonic frequency using the pulse driver to realign the molecular structures. The anechoic insert 70, and other similar inserts, can be used to limit external sounds and vibrations from entering the chamber and to facilitate directing sound within the chamber.

A miniaturized, electromagnetically-isolated Bose Einstein optical table can used create new phase forms of matter from condensed states. In this phase form, matter can be additionally perturbed by a mechanical device similar to a diamond anvil pressure type cell, creating the potential for effectively forcing two varying forms of matter together. According to the present invention, it would take significantly less pressure and energy than presently known systems that do not apply pressure and energy in a high entropy environment, such as found inside the chamber 10. For example, according to the Osaka University experiments on superconducting magnetic metals, such as reported in the Journal of Physics: Condensed Matter, Vol. 14, p. 10467-10470 (published Nov. 11, 2002), researchers discovered the onset of superconductivity in the case of iron under pressure. In particular, using electrical resistance measurements, a maximum value of the superconducting transition temperature of 2 K is observed under pressure of 20 GPa. The researchers also reported the phenomenon as it relates to the Meissner effect based on the detection of the diamagnetic signal. According to the present invention, the Osaka University experiments will require significantly less energy and pressure within the high entropy chamber that is created by the electromagnetic shield 18 and the superconducting shell 20 according to the present invention. Therefore, the chamber 10 will also be able to more efficiently create Bose-Einstein condensates and conditional artificial gravity-like fields that are proportional to the force exerted.

Multiple superconducting shells 20 can also be nested together in the present invention. For example, the gyroscopic embodiment schematically illustrated in FIG. 9 has four nested superconducting shells 20. As with all of the embodiments, external electromagnetic fields are shielded from the interior of the chamber 10, such as discussed above with regard to the shielding of electromagnetic radiation, electrical fields and magnetic fields by the electromagnetic shield 18. To create the gyroscopic effect, each of the nested shells can have a banded power strip 72 directing electric current in different directions (x+, x−, y+45°, z−45°) emulating the motion of a moving gyroscope. The electrical signals can be established in each of the spheres through individual initiating switches or by computer program that controls the flow of electricity through each sphere.

A given gyroscope moment G will always result in the same ratio of energy to frequency. Another example is an electron in an external magnetic field. The electron has a gyroscopic moment and a magnetic field. An electron has electromagnetic radiative losses and operates in a linear external magnetic field that serves to invert it. However, gyroscopic math is identical with the electron's gyroscopic moment being h/2), as set forth in equation 2 below where E is energy, υ is precession of the primary axis, G is the gyroscopic moment and h being Plank's constant.

$$E/v = 2 \cdot G \quad [\text{eq. 2}]$$
$$= 2 \cdot (h/2),$$
$$= h$$

Planck's constant, owing nothing to the electromagnetic world, is a purely gyroscopic property. The concept that the electron spin is 1/2 is related to its gyroscopic moment being h/2. In an additional embodiment with room-temperature superconductors, it could also be possible to physically rotated each of the spheres. With room-temperature superconductors, it could also be possible to physically rotate each of the spheres.

Four different superconducting walls can be used with the present invention. The four superconducting walls have independent rotation each be manipulated through a spinning mass, such as a disk/wheel, mounted on the base so that its axis can turn freely in one or more directions and thereby maintain its orientation regardless of any movement of the base motor and shaft. Electromagnetic energy can also be directed across the surface of the four different, spatially-separated spheres in different directions enabling a stationary electromagnetic gyroscope. For embodiments in which the nested shells 12 includes the coolant reservoir 24, electromagnetic fields, lasers or visible light, invisible light including all waveforms from radio to gamma, magnetic fields or a combination thereof may also be used.

Figures 9, 10, 11:
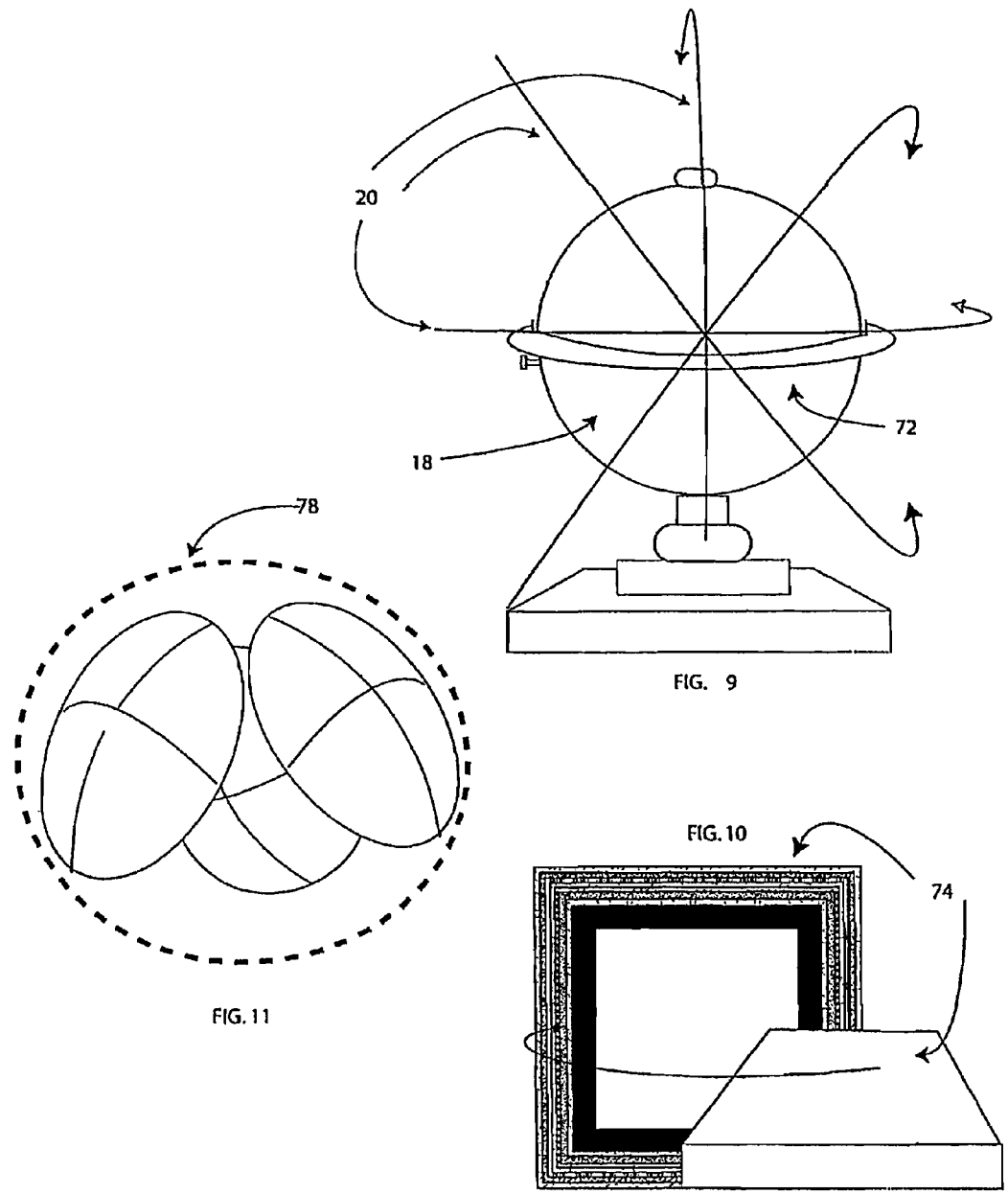
FIG. 9 illustrates a schematic representation of a gyroscopic embodiment.
FIGS. 10 and 11 illustrate alternative embodiments of the present invention.
Figure 12:
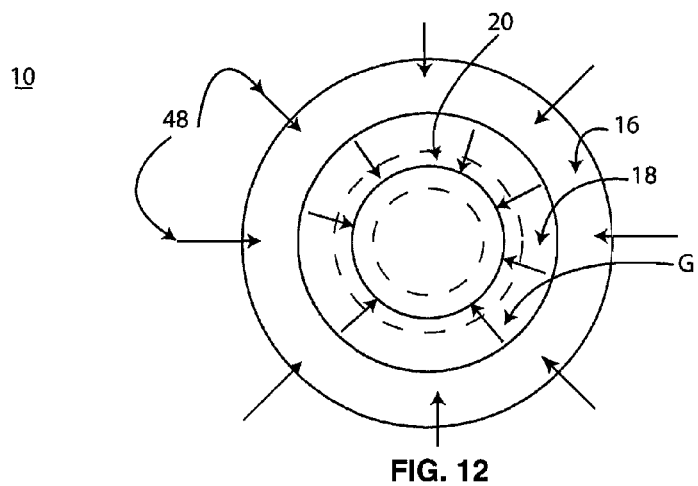
FIG. 12 illustrates a schematic of a single chamber with bridge attachment.

From the above description and the corresponding illustrations, it will be appreciated that the present invention uses the superconducting fields to alter the zero point energy system within the chamber 10. As such, the chamber 10 serves as a catalyst for increasing the efficiency in manipulating materials through the transfer of energy. In particular, within the closed chamber, the strong and weak force on atomic volume of the work product 14 are at a lower order configuration and confirmation, and the work product can then be perturbed/excited by the electromagnetic and/or kinetic energy fields to enable higher order manipulation of the work product's atomic and molecular structures. Additionally, the chamber 10 can be formed in different shapes and sizes. For example, the chamber illustrated in FIG. 5 can be large enough to enclose people, equipment and other structures and the chamber illustrated in FIG. 6 can be small enough to be portable. The chamber 10 can be used for altering atoms a work product 14, which can range from inanimate materials and objects to biophysical organisms and even human patients. Accordingly, the chamber can be used in life sciences to minimize cellular necrosis caused by blunt force trauma. The chamber raises overall entropy of the patient's atomic and molecular structures, allowing for localized medical intervention with minimal damage to systemic tissues. Therefore, the chamber could also be used as an operating room for surgical intervention to minimize damage to systemic tissues. The chamber can be used in manufacturing to alter material properties of chemicals, pharmaceuticals, superconductors, effecting molecular configuration and confirmation. Various geometric shapes can be used to accomplish the same electromagnetic isolated environment. For example, FIG. 10 illustrates electronic equipment 74 with a casing 10 designed according to the present invention.

There is electromagnetic shielding uniformly around the device regardless of its geometry; be it a parabola, triangle, cube, tube or other geometric shape. As evident from the various embodiments illustrated, different geometric shapes can be utilized to accomplish the same electromagnetic isolated environment. For example, as particularly illustrated in FIG. 11, a chamber 10 is created by parabolic-focused sections 76 within an electromagnetically isolated environment 78. One example of such an electromagnetically isolated environment 78 would be a room designed to completely shield outside electromagnetic fields from entering the interior chamber. Each of the six concave superconducting surfaces 76 focus on a center point area that contains the work product. From this embodiment of the present invention, it will be appreciated that within the electromagnetically isolated environment 78, the chamber 10 can surround the work product with a partial enclosure.

Generally, within the closed chamber, a low ordered high entropy stasis field is maintained, and the amount of internal energy to perturb atomic spherics strong and or weak force is minimal. Accordingly, the forces necessary to perturb atoms or molecules of the work product 14 within stasis fields of the closed chamber 10 are proportionately low compared to the forces necessary outside of the chamber. The present invention permits the formation of new molecular structures, stronger molecular bonds on existing elements, alterations in stable atomic structures and neutralization of radiation, and even the creation of new forms of matter and gravitational probability waves from existing Bose Einstein Condensates.

Figure 13:
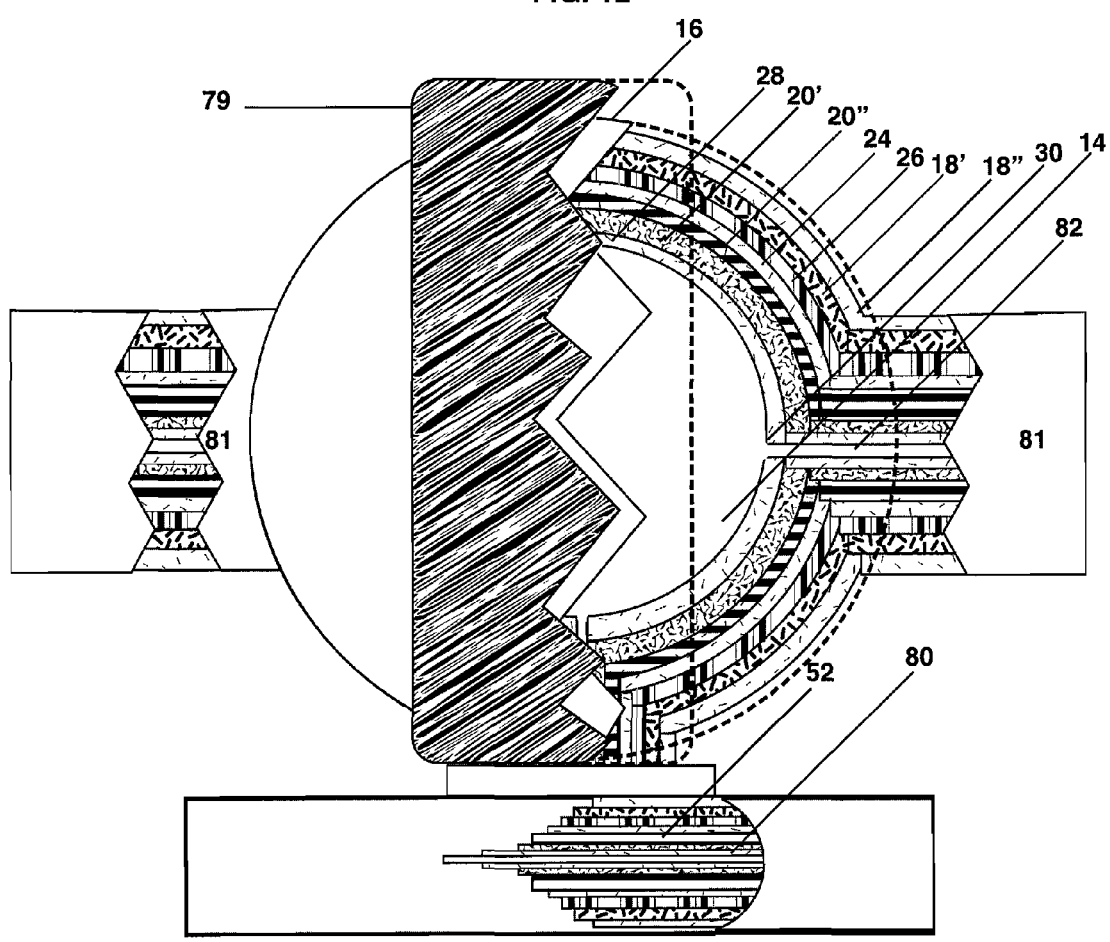
FIG. 13 illustrates cross-section view of a single chamber of FIGS. 14 and 15.

FIG. 13 is a schematic cross section of one chamber used concurrently in a series of interconnecting chambers for both the ESD (Entropic Step Down) embodiment and the EPS (Entropic Perturbation System) embodiment. The chamber is formed in layers as a series of nested shells that surround the work product 14 at the interior portion of the chamber. An outer structural casing 16 forms the exterior surface of the chamber. Within the structural casing 16, an electromagnetic shield 18 which surrounds a superconducting shell 20. The superconducting shell 20 is preferably immersed in a cryogenic coolant 22 contained in a reservoir 24. The reservoir 24 is preferably formed by a pair of Dewar flasks 26, 28 on opposite sides of the superconducting shell 20, i.e. the superconducting shell is sealed between the outer Dewar flask 26 and inner Dewar flask 28. The inner Dewar flask 28 is preferably protected by an inner casing 30 around the interior portion of the chamber 10. A cutaway view of a torus 79 completely surrounds the sphere housing sound mechanism for transfer into the chamber 88 to facilitate kinetic manipulation of the work product. The bridge 81 and the base 52, constructed of nested superconducting shells, are used to interconnect a series of chambers that collectively mediate space time effects associated with molecular van der Waals and electromagnetic fields to maintain the isolated electromagnetic environment bringing the work product to its ground state boundary conditions across the system. The spherical shell closed cavity resonator and potential Casimir force directed away from its center is explored in QFT Limnit of the Casimir Force, article by Marco Scandurra. The base 52 is the portal for the introduction of work product through an isolated channel 80 that enters the base of the chamber. The torus 79 houses interchangeable multi-frequency sound drivers, infrasound through white noise to ultrasound, that wrap around the chamber focusing sound perturbations on the work product in the chamber interior 14. As presented in the article entitled "Large-Scale Surveys and Cosmic Structure" by J. A. Peacock: "The cosmological horizon at matter-radiation equality also enters in the properties of the baryon component. Since the sound speed is of order c, the largest scales that can undergo a single acoustic oscillation are of order the horizon. The transfer function for a pure baryon universe shows large modulations, reflecting the number of oscillations that have been completed before the universe becomes matter dominated and the pressure support drops. The lack of such large modulations in real data is one of the most generic reasons for believing in collisionless dark matter. Acoustic oscillations persist even when baryons are subdominant, however, and can be detectable as lower level modulations in the transfer function." The use of focused sound is also generally discussed in the article "The Force Of Acoustics" published on Dec. 4, 1998 by PhysicsWeb. Electromagnetically shielded driver energy is from an outside power source.

FIG. 14*a* is an aerial down drawing and FIG. 14*b* is a schematic representation of the SAM ESD Entropic Step Down power generation system. The ESD is constructed of a series of shells 83, 85, 86, 87, 88 all built to the superconducting nested shell specifications in the schematic of FIG. 13 and evidenced in FIGS. 14*c* and 14*d*. The torus 79 can be used on one or across a series of chambers, 83, 84, 85, 86, 87 and 88 (see FIGS. 14*a*, 14*b*, 15*b* and 15*c*). In FIG. 14*d* an additional torus 92 is used in tandem with torus 79, this combination can also be used across any chamber or multiples. Each chamber can be tuned to resonate at a specific frequency, see dotted line torus FIG. 15*b*, For example, chamber 83 is tuned to resonate with the vibration frequency emitted by its torus 79 to excite hydrogen, while chamber 84 is tuned to resonate alternating excitation frequencies of hydrogen/helium and chamber 87 is tuned to resonate frequency of helium (see also "Seeing Sound Waves in the Early Universe" article by Arthur Kosowsky and "Spinodal Instability in the Quark-Gluon Plasma" article by C. E. Aguiar, E. S. Fraga, and T. Kodama). Zero point energy ZPE release in 87's "electromagnetic vacuum" chamber enables single wave matter state potential. According to the "Vacuum Energy" article by M. D. Roberts: "Larraza and Denardo (1998) present theoretical and experimental results for the force law between two rigid, parallel plates due to the radiation pressure of band-limited acoustic noise. They claim excellent agreement is shown between theory and experiment. While these results constitute an acoustic analog for the Casimir effect, an important difference is that the band-limited noise can cause the force to be attractive or repulsive as a function of the distance of separation of the plates. Applications of the acoustic Casimir effect to background noise transduction and non-resonant acoustic levitation are suggested."

Figure 16:
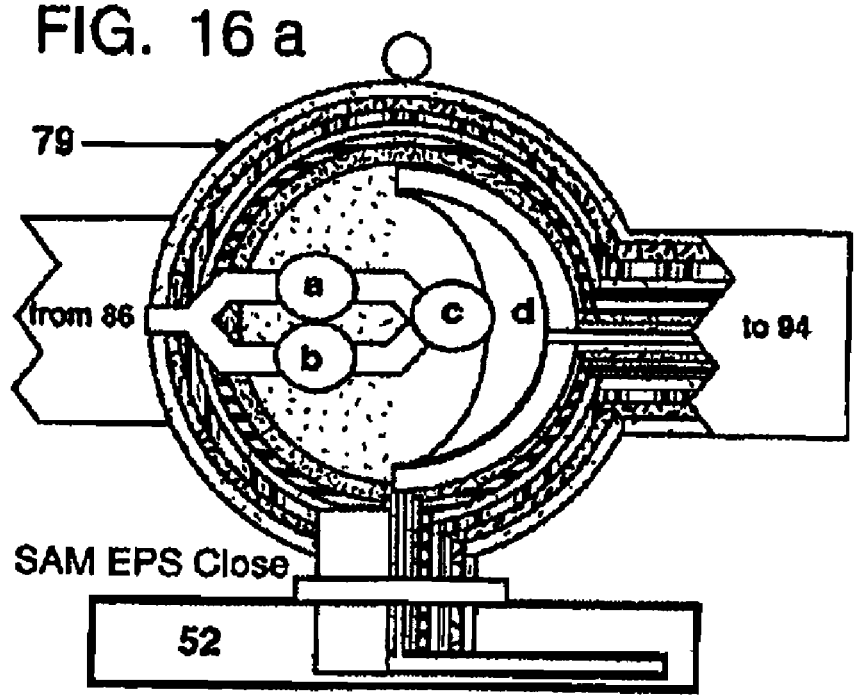
FIG. 16 illustrates a wave cancellation apparatus for the present invention.
Figure 16:
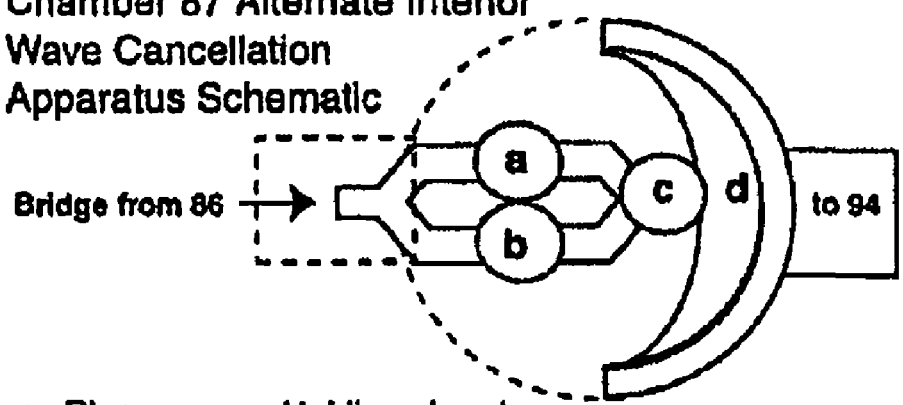

The energy driver of FIG. 14*a* begins with ZPE chamber 87. In chamber 88, the work product is divided into wave cancellation apparatus 100 consisting of two interior acoustically separated spherical chambers 100*a*, 100*b* (see FIG. 16). In FIG. 16, interior chamber 100*a* work product resonates at the frequency of helium, and chamber 100*b* work product resonates at variable time reversal of chamber 100*a* work product from 180° out of phase to "in phase" with work product of 100*a* (see "An Overview of Time-Reversal Acoustic Communications" article by G. F. Edelmann and "The Phased Array Technology-Application to Time-Reversal in Acoustics" article by D. Cassereau, M. Fink). In FIG. 16, the plasma audio driven wave state is kinetically moved into interior chamber 100*c* that intermixes wave state work product of 100*a* and 100*b* facilitating specific phase cancellation of the excited helium plasma single wave state into wave packets facilitating controlled distribution into compartment 100*d*. From 100*d*, the work product is kinetically driven into superconductor shielded routers tubes each with its own phase reversed helium resonant frequency audio driver that streams the notched plasma wave "packets" into multiple specifically tuned electromagnetic field amplifiers with poloidal containment fields 89 where wave packets are converted from zero point to electromagnetic energy in small mix resonant tuned fail-safe chamber 91 before final distribution to a conversion turbine driver system graphically represented by 90 (see "Electron Acceleration by a Plasma Wave in a Sheared Magnetic Field" article by K. P. Singh, V. L. Gupta, Lalita Bhasin and V. K. Tripathi). In another embodiment a superconducting stellarator, or a tokomak, or any magnetic poloidal confinement device of sufficient strength for ZPE transition and containment of electromagnetism could augment or replace the nuclear magnetic resonator 89, 94, 95, 96, 97 as shown in FIGS. 14*b* and 15*b*.

Force balance between internal zero point energy forces under kinetic pressure and the forces of the nuclear magnetic resonator is studied using magnetohydrodynamics. Balancing forces of kinetic pressure with magnetic field realizes $$c\Delta p = J \times B \qquad [\text{eq. 3}]$$

J in this case is the ZPE density of the work product in the chamber, B is total magnetic field and p is kinetic pressure on work product, c is speed of light. While the equation needs to be solved numerically within certain limits it is possible to obtain analytical results. The nuclear magnetic resonators (NMR) 89, 94, 95, 96, 97 in conjunction with the bridge 81 functions similar to a tokomak with a rotational symmetry and each cross section through this symmetry axis are identical making the equilibria (balancing forces of kinetic pressure with magnetic field) basically 2 dimensional. The magnetic field is stronger inside the NMR torus and varies roughly l/R where R is the distance from a point in the work product in the bridge 81 to the NMR torus with poloidal field coils for work product placement and shaping facilitating constant magnetohydrodynamic process across the length of the resonators 89, 94, 95, 96, 97. Electromagnetically shielded field driver energy is from an outside power source.

FIGS. 15*b* and 15*c* illustrate the SAM EPS Entropic Perturbation System and utilize the same basic structure of chamber 10, torus sound application 79, base 52 and bridge 81 found in FIG. 14. The single wave state moves into a series of graduated (0 to 100%) narrow beam focused electromagnetic field amplifiers 94, 95, 96 and 97 facilitating zero point energy conversion to electromagnetic energy across the complete single wave state for the purposes of propulsion through an electromagnetically controlled nozzle 98 yielding an energy potential on the scale of a magnetic flux tube (see "Dynamic and Stagnating Plasma Flow Leading to Magnetic Flux Tube Collimation" article by S. You, G. Yun, and P. M. Bellan). The central bridge 81 runs on a central axis core of the electromagnetic field amplifiers 94, 95, 96 and 97 graduating superconducting entropy from (100%-0) across electromagnetic field amplifiers evident in the dotted line cutaway reveal of 94, 95 and 96. An alternate embodiment for ESP propulsion would incorporate the wave packet division in chamber 87 that is divided into two interior acoustically separated spherical chambers in 87. The first interior chamber resonates at the frequency of helium, and chamber two resonates at a time reversal of helium that enables a multiple wave packet matter streams for variable controlled thrust.

Another embodiment of the invention augments the electromagnetic field blocking properties of the superconducting system by using metamaterials. Metamaterials are similar to superconductors in that, just as with superconductors, they are constructed of lattice microstructures and composites and are designed nanostructure materials to give an effective EM (electromagnetic) response through optical interaction of incident wave with the refractive wave. The basic structure of metamaterials is found in conventional superconductor as well as some conventional materials in that it is a highly ordered on the nano scale. In a superconductor the line of the magnetic field penetrates the conductor's lattice structure and align with the lattice pattern and each aligned bundle positions itself equidistant to its neighbor, the EM pins or itself and is absorbed in the conductor. In metamaterials, the incident EM wavelength interacts with the refractive wavelength from nanostructres designed to interact with the specific waveform. Examples of metamaterials are: a left handed metamaterial or frequency agile metamaterial can tune over a range of frequencies of the "terahertz gap" blocking field interacting to the interior chamber; a split ring resonator (SRR) achieves a negative $\epsilon(\omega)$ response; an artificial structure of a wire medium supporting $\epsilon<0$ for the polarization of the incident EM wave, or a unit cell of an artificial magnetic metamaterial could also be utilized to augment the superconducting, metglass, niobium system. Additionally, any combination of these or other metamaterials could be utilized as a EM blocking mechanism in addition to the superconducting system, or series of specific nested metamaterials could be used as a stand alone system to facilitate blocking specific electromagnetic fields from entering the chamber with the net result being the blocking of all electromagnetic fields from entering the chamber. Accordingly, metamaterials can be used in conjunction with the superconductor, metglas, niobium or other EM blocking material to facilitate the invention, or as a stand alone metamaterials system.

FIGS. 17A and 17B illustrate a metamaterial embodiment of the SAM Spheric Alignment Mechanism which can also be applied to the SAM Entropic Perturbation System and SAM Entropic Step Down. The superconductor system of the preferred embodiment can be augmented with metamaterial shells 102 to accomplish blocking all electromagnetic fields from entering the nexus.

FIG. 17C illustrates a cross section of multiple metamaterials shells 102 nested across the electromagnetic spectrum. Each metamaterial shell 102A, 102B, 102C is designed for a negative refraction index for a specific electromagnetic waveform 104A, 104B, 104C. Additionally, metameterial superlattices can be employed to block magnetic fields from entering the internal chamber. Each of the shells cover a range of frequencies as seen in 17C. The number of metamaterial shells needed to facilitate desired field blocking can include a series of layered metamaterials with each shell capable of blocking a group of frequencies; for example one layered series would block all radio frequencies, another layered series would block all microwave, another all infrared and so on. It is anticipated that a room temperature metamaterial SAM can be made without need of any superconducting structure.

The description of the invention is merely exemplary in nature and, thus, variations that do not depart from the gist of the invention are intended to be within the scope of the invention. From the description of the embodiments above, it will be appreciated that sound is the preferred perturbator of the work product, but other types of kinetic energy and even energy can be used to manipulate the work product. As examples of these alternative manipulators, pressure, light and electromagnetic energy are particularly discussed. Regardless of the type of energy that is used within the chamber 10 on the work product, the interior of the chamber 10 is electromagnetically shielded from its ambient environment. Therefore, all electrical input into the chamber 10 enters through a electromagnetically shielded superconducting wire and does not introduce any electromagnetic fields into the ambient state absent the controlled perturbation of the work product within the chamber. Accordingly, such variations are not to be regarded as a departure from the spirit and scope of the invention.

What is claimed is:

1. A chamber for altering strong force bonds in a work product, comprising:
   an electromagnetic shield positioned around the work product, wherein said electromagnetic shield is substantially impervious to electromagnetic radiation, electrical fields and magnetic fields;
   a plurality of nested shells surrounding the work product, wherein said shells are selected from the group of materials consisting of superconductors, metamaterials and a combination thereof; and
   a sound perturbation system in operative communication with the work product inside said shells.

2. The chamber set forth in claim 1, wherein said nested shells have an open position and a closed position.

3. The chamber set forth in claim 2, wherein said nested shells are comprised of a pair of interconnected hemispheres and wherein at least one of said pair of interconnected hemispheres.overlaps the other of said pair of interconnected hemispheres and wherein said flange provides a pressure seal.

4. The chamber set forth in claim 2, wherein said nested shells are comprised of a plurality of interconnected, overlapping walls.

5. The chamber set forth in claim 1, wherein said metamaterial is selected from the group of highly ordered composite materials consisting of a frequency agile metamaterial, a split ring resonator, an artificial structure of a wire medium, a unit cell of an artificial magnetic metamaterial, metamaterial superlattices and any combination thereof.

6. The chamber set forth in claim 1, further comprising a series of nested shells and a bridge between said series of nested shells, wherein said bridge is selected from the group of materials consisting of superconductors, metamaterials and a combination thereof.

7. The chamber set forth in claim 1, further comprising a reservoir containing a coolant in contact with at least one side of said superconductors.

8. A chamber for altering strong force bonds in a work product, comprising:
   a plurality of nested shells surrounding the work product and having an open position and
   a closed position, wherein said shells are comprised of a highly ordered material structure selected from the group consisting of superconductors, metamaterials and any combination thereof;
   a base supporting said nested shells; and
   a means for transferring energy from outside of the chamber into the chamber through said nested shells.

9. The chamber set forth in claim 8, wherein said metamaterials have negative refraction indexes corresponding to electromagnetic waveforms or groups of electromagnetic waveforms.

10. The chamber set forth in claim 8, further comprising a bridge between said nested shells and another plurality of nested shells.

11. The chamber set forth in claim 8, wherein said energy transferring means includes a sound perturbation system surrounding said nested shells which is in operative communication with the work product inside said nested shells.

12. The chamber set forth in claim 11 wherein said nested shells are metamaterial shells.

13. The chamber set forth in claim 8, wherein said energy transferring means is comprised of an encapsulated electrical circuit extending through said nested shells.

14. The chamber set forth in claim 13 wherein said nested shells are metamaterial shells.

15. The chamber set forth in claim 8, further comprising an electromagnetic shield positioned around the work product, wherein said electromagnetic shield is substantially impervious to electromagnetic radiation, electrical fields and magnetic fields.

16. A chamber for altering strong force bonds in a work product, comprising:
a plurality of shells surrounding the work product, at an interior region of the shells wherein said shells are selected from the group of materials consisting of superconductors, metamaterials and a combination thereof, wherein said shells comprise a first shell section and a second shell section with an overlapping section at an interconnection between said first shell section and second shell section and said shells have an open position wherein said interior region is accessible from a space exterior to said shells and a closed position wherein said interior region is inaccessible from a space exterior to said shells wherein said first shell section is moveable at said interconnection relative to said second shell section and wherein said first shell section and said second shell section overlap at said interconnection when said shells are in said closed position and do not overlap at said unterconnection when said shells are in said open position; and
a base on which said plurality of shells is mounted in said space exterior to said shells.

17. The chamber set forth in claim 16, wherein said chamber comprises an electromagnetic shield comprising a superconducting shell.

18. The chamber set forth in claim 17, further comprising a reservoir containing a coolant in contact with at least one side of said superconducting shell.

19. The chamber set forth in claim 16, further comprising a means for transferring energy from outside of the chamber into the chamber through said plurality of shells.

20. The chamber set forth in claim 19 wherein said plurality of shells comprises nested metamaterial shells.

21. The chamber set forth in claim 16, further comprising a sound perturbation system in operative communication with the work product inside said shells.

22. The chamber set forth in claim 16 wherein said plurality of shell comprises nested metamaterial shells.

* * * * *